UNITED STATES PATENT OFFICE.

RUFUS R. BOLT, OF CANTON, OHIO, ASSIGNOR OF ONE-HALF TO ALFRED BURDELOW, OF CANTON, OHIO.

BRICK.

1,318,960.     Specification of Letters Patent.     Patented Oct. 14, 1919.

No Drawing.     Application filed May 24, 1919. Serial No. 299,657.

*To all whom it may concern:*

Be it known that I, RUFUS R. BOLT, a citizen of the United States, residing at Canton, in the county of Stark and State of Ohio, have invented new and useful Improvements in Bricks, of which the following is a specification.

The general object of my present invention is to provide an exceedingly inexpensive brick of good wearing and fire-resisting qualities, designed more especially for use in the bottoms or lower portions of heating furnaces such as are employed in steel mills where wearing quality is an important factor.

To the attainment of the foregoing, my invention consists in a brick composed of the following ingredients combined in approximately the proportions stated, viz:

Roll scale_____ 75%
Clay_____ 25%

In the manufacture of my novel and advantageous brick, the clay which may be common clay or what is commonly known as fire-clay, in the discretion of the manufacturer, is suitably commingled with the roll scale, while the clay is in a plastic state, and so that the roll scale is evenly distributed throughout the mass of clay. The clay is then reduced to brick form, and after the brick is dried or baked, the same is ready for use.

Experiment has demonstrated that the said brick is possessed of the requisite wearing and fire-resisting qualities for the specific purpose stated, and the cheapness of the brick will be readily appreciated when it is stated that the roll scale is practically a waste substance, and the clay is easily procurable in all localities. It will also be readily understood that no expensive machinery is necessary to the production of my novel brick; the roll scale being such as drops off iron or steel members while the same are being rolled.

Having described my invention, what I claim and desire to secure by Letters-Patent, is:

1. A brick for the purpose described, comprising clay and roll scale.
2. A brick for the purpose described, formed of a major portion of roll scale and a minor portion of binding substance.
3. A brick for the purpose described formed of a major portion of roll scale and a minor portion of clay.
4. A brick for the purpose described composed of 75% of roll scale and 25% of clay.

In testimony whereof I affix my signature.

RUFUS R. BOLT.

Copies of this patent may be obtained for five cents each, by addressing the "Commissioner of Patents, Washington, D. C."